J. P. HEDSTROM.
FEED FINGER MECHANISM.
APPLICATION FILED JULY 15, 1909.
1,031,711.
Patented July 9, 1912.
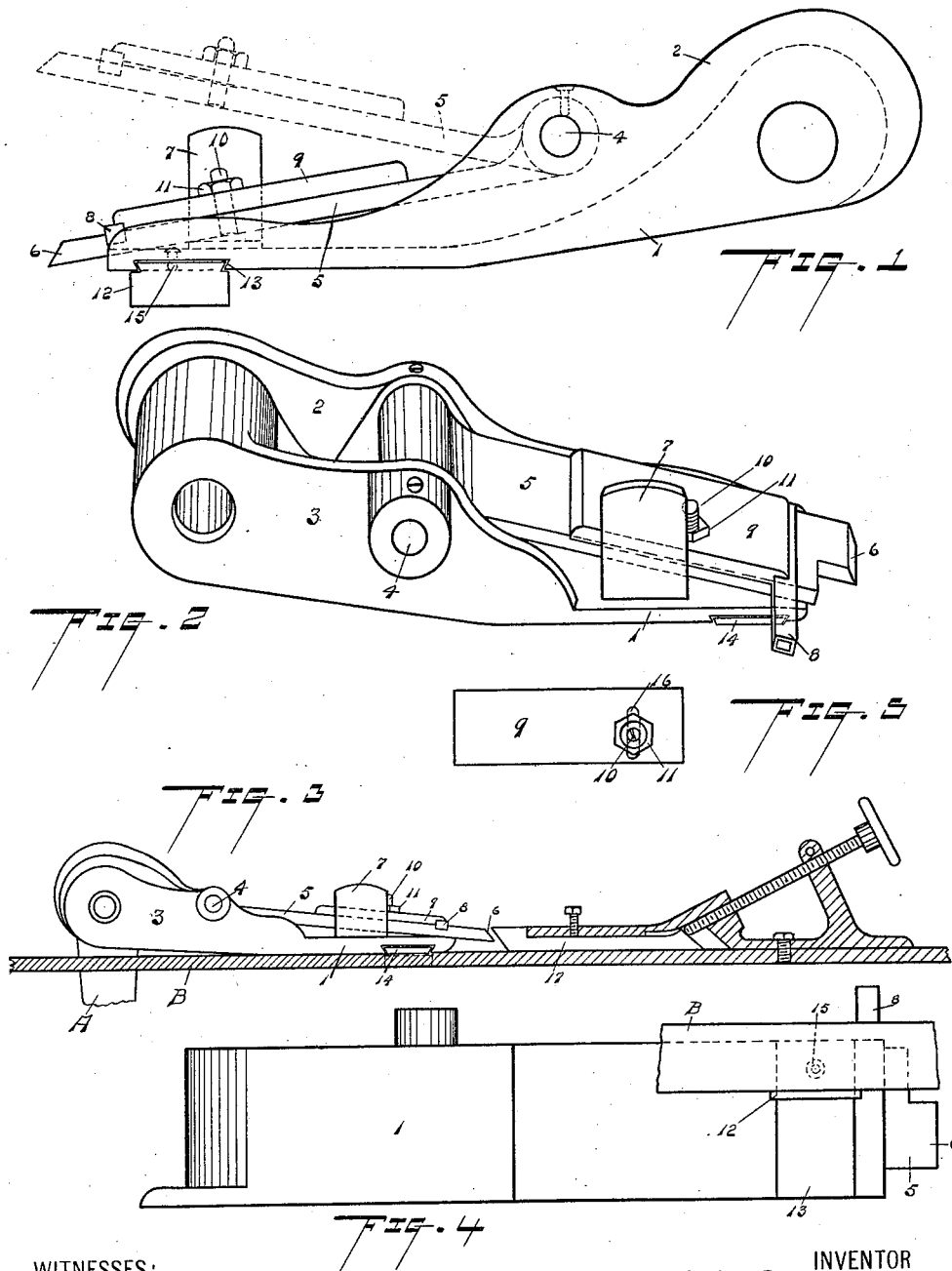

UNITED STATES PATENT OFFICE.

JOHN P. HEDSTROM, OF BIG RAPIDS, MICHIGAN, ASSIGNOR TO HANCHETT SWAGE WORKS, OF BIG RAPIDS, MICHIGAN, A CORPORATION OF MICHIGAN.

FEED-FINGER MECHANISM.

1,031,711.  Specification of Letters Patent.  Patented July 9, 1912.

Application filed July 15, 1909. Serial No. 507,667.

*To all whom it may concern:*

Be it known that I, JOHN P. HEDSTROM, a citizen of the United States, residing at Big Rapids, in the county of Mecosta and State of Michigan, have invented certain new and useful Improvements in Feed-Finger Mechanisms; and I do hereby declare the following to be a full, clear, and exact description of the invention, such as will enable others skilled in the art to which it appertains to make and use the same.

My invention relates to feed finger mechanism which, while adapted and herein shown and described as being applied to saw sharpening machines, is applicable to other machines as well.

Heretofore, it has been customary to pivot the finger holder directly to the feed lever, the free end of the holder being slidingly received upon a suitable wearing plate and carrying a laterally projecting finger to engage and move the saw step-by-step.

One disadvantage pertaining to this structure is that as the holder is quite heavy, it is liable to rotate the saw in the opposite direction to that desired. Thus, in its forward movement, the finger enters the throat between two adjacent saw teeth and advances the saw one step. On its return or back stroke, the finger rides over one tooth, whereby its entire weight is supported on the tooth and is liable to impart a reverse movement to the saw.

It has been found that the forward stroke of the finger tended to force the saw laterally away from the machine, to avoid which tendency it was deemed necessary to equip the holder with a guide taking against a stationary part of the machine to prevent lateral movement of the finger. In operation, such guide tended to bind against the frame and prevent the free movement of the holder, and when this was rectified by permitting a slight play between the guide and frame, the tendency to force the saw sidewise again, became apparent. In either case, however, the raising of the entire holder on its pivotal connection with the feed lever often resulted in permitting the guide to rest on top of the frame, thus elevating the feed finger above the saw teeth and out of operative position.

A further objection to the former type of feed finger holders is that the emery wheel throws hard, gritty particles onto the frame and the raise imparted to the holder on its recovering movement permits these hard particles to enter between the frame and holder, clogging the operation of the latter and scoriating the abutting faces of the holder and wear plate.

It is one object of my invention to provide a finger mechanism of this character wherein the holder rides smoothly and continuously back and forth on its support without rising and falling.

Another object is the provision of means for preventing lateral movement of the rectilinearly movable finger-carrying mechanism.

Still another object is the provision of means for preventing the emery or metal dust from accumulating on the finger mechanism.

A further object is the provision of means for taking up wear of the parts. And a still further object is the provision of means for preventing a rising movement of the feed finger prior to its backward or recovering movement.

To these and other ends, therefore, my invention consists in certain novel features and combinations such as will be more fully described hereinafter and particularly pointed out in the claims.

In the accompanying drawings, Figure 1 is a side view of one embodiment of my invention, Fig. 2 is a perspective top plan view thereof, Fig. 3 is a view of the opposite side of the invention from that shown in Fig. 1, parts being shown in cross-section, Fig. 4 is a bottom plan view, and Fig. 5 is a detail view of the clamping plate.

In that form of my invention herein illustrated, A indicates a swinging feed lever of the usual type, and B, any suitable stationary part of the frame, preferably a wear plate, above which the free end of the feed lever extends.

A shoe 1 is pivotally secured in any convenient manner to the feed lever, the under face of the shoe being angular so that the forward portion or toe of the shoe will rest flatly upon the support.

The inner side of the shoe is conveniently provided with an upright web 2 extending from heel to toe thereof, the web being preferably reduced in height as it nears the toe of the shoe.

The outer side of the shoe is provided with a similar web 3, which preferably though not necessarily extends part way only toward the toe. These webs conveniently serve as supports for a journal pin 4, received in suitable apertures formed in the webs, on which pin is pivotally mounted the rear end of a downwardly inclined leaf 5, the free end of which projects beyond the toe of the shoe and is beveled as at 6 for a purpose hereinafter set forth. The rear edge of this leaf has a sliding fit against the inner face of the web 2, to prevent lateral inward movement of the leaf, a combined guide and shield 7 being carried by the forward portion of the shoe and extending vertically, parallel with the web 2 and in contact with the outer edge of the leaf to prevent lateral outward movement thereof. This guide also acts as a shield to prevent the emery and metal dust from accumulating on the shoe or leaf. Obviously, the guide may be made wider than is shown, or the web 3 extended to the toe like the web 2.

The swinging leaf is transversely grooved to form a seat for a feed finger 8 held in place by a rabbeted clamping plate 9, which plate is secured to the leaf by a headless screw 10 and nut 11, all of which is included in and forms a part of my co-pending application Serial No. 418,608, filed Feb. 29, 1908.

I have described the manner in which the leaf carrying the feed finger is held from lateral movement. In order to prevent lateral movement bodily of the shoe and its connected parts, I provide the shoe with a depending lip 12 adapted to take against the inner edge of the wear plate B. Since the shoe does not swing as the finger is retracted but moves in a rectilinear path only, this lip can be arranged to fit closely against the face of the plate B, to avoid play. Preferably, I form an undercut groove 13 in the under face of the toe portion of the shoe, to receive a slide 14 to which the lip is secured, such slide being held in place by the set screw 15 carried by the toe.

In order to take up any wear between the leaf and the guide 7, I provide the clamping plate 9 with a transverse slot 16, through which the screw 10 passes. By loosening the nut 11, the plate can be set over against the inner face of the guide and the nut tightened.

It sometimes happens that the feed finger has a tendency to rise, owing to the spring or tension of the saw itself, especially band saws, thereby causing the saw to be ground unevenly, to avoid which I provide an under-beveled bumper 17 with which the beveled end 6 of the leaf engages and by which the leaf is held down against any tendency to rise. The construction of the bumper 17, aside from having its outer end arranged to hold down the leaf 5, forms no part of my invention.

My invention consists primarily in the provision of a double jointed feed finger holding mechanism wherein the body of the holder is relieved from swinging as it rides over the successive teeth of the saw.

By so arranging the parts that the shoe does not swing or rock, I am able to absolutely prevent lateral play of the shoe and relieve the saw of considerable weight as it is being fed.

It is evident that changes might be made in the form and arrangement of the several parts described without departing from the spirit and scope of my invention.

Having thus fully disclosed my invention, what I claim as new, is:—

1. A feed mechanism of the character described, comprising a feed lever, a wear plate, a shoe having an angular under face and upright side webs, a downwardly inclined leaf pivoted to the shoe and formed with a beveled end, and a laterally projecting feed finger on the leaf.

2. A feed mechanism of the character described, comprising a wear plate, a rectilinearly movable shoe, a leaf pivoted to the shoe, and a feed finger mounted on the leaf.

3. A feed mechanism of the character described, comprising a frame, a rectilinearly movable shoe having on its inner side a projecting member adapted to engage said frame to prevent lateral movement of the shoe in one direction, a leaf pivoted to the shoe, and a laterally projecting finger mounted on the leaf.

4. A feed mechanism of the character described, comprising a rectilinearly movable shoe, webs on the shoe, a pin mounted in the webs, a leaf journaled on the pin, and a laterally projecting finger mounted on the leaf.

5. A feed mechanism of the character described, comprising a rectilinearly movable shoe, a wear plate on which the shoe rides, a depending lip carried by the shoe and engaging a side face of the wear plate to prevent lateral movement of the shoe in one direction, a leaf pivoted to the shoe, and a laterally extending finger mounted on the leaf.

6. A feed mechanism of the character described, comprising a rectilinearly movable shoe, a leaf pivoted to the shoe, means carried by the shoe for preventing lateral movement of the leaf relative to the shoe, a laterally projecting finger mounted on the leaf, and means for clamping said finger to said leaf.

7. A feed mechanism of the character described, comprising a rectilinearly movable shoe, means for preventing lateral movement thereof in one direction, a vertically movable leaf pivoted to the member, a laterally projecting removable finger mounted on the leaf, and means for preventing lateral movement of the leaf relative to the shoe.

8. A feed mechanism of the character described, comprising a rectilinearly movable pivotally mounted shoe, a leaf pivoted to the shoe, a combined guide and shield carried by the shoe and adapted to engage the leaf to prevent lateral movement thereof in one direction, and a laterally projecting removable finger mounted on the leaf.

9. A feed mechanism of the character set forth, comprising a rectilinearly movable pivoted shoe, a leaf pivoted thereto, a laterally projecting finger mounted on the leaf, a clamping plate adjustably secured to the leaf for retaining the finger in position, a guide on the shoe, the clamping plate being adjustable laterally to take up wear between the leaf and guide.

10. A feed mechanism of the character described, comprising a rectilinearly movable member, a carrier pivotally supported thereon and projecting beyond the end thereof, a bumper having an undercut end, the outer end of the carrier adapted to take under the bumper.

11. A feed mechanism for saw sharpening machines, comprising a reciprocating member, the free end of which is beveled, and an under-cut bumper with which the beveled end is adapted to engage.

12. A feed mechanism of the character described, comprising a swinging lever, a rectilinearly movable angular faced shoe pivoted to the lever and extending in advance thereof, a downwardly inclined leaf pivoted on the rectilinearly movable member, and a removable finger projecting laterally from the leaf.

In testimony whereof, I affix my signature in presence of two witnesses.

JOHN P. HEDSTROM.

Witnesses:
H. J. HEYDENBURG,
E. D. SANFORD.

Copies of this patent may be obtained for five cents each, by addressing the "Commissioner of Patents, Washington, D. C."